United States Patent [19]

King, Jr. et al.

[11] Patent Number: 5,726,856
[45] Date of Patent: Mar. 10, 1998

[54] HEXASUBSTITUTED GUANIDINIUM SALTS AND ULTRACAPACITORS EMPLOYING THEM AS ELECTROLYTES

[75] Inventors: Joseph Anthony King, Jr.; Peter David Phelps, both of Schenectady, N.Y.

[73] Assignee: General Electric Company, Schenectady, N.Y.

[21] Appl. No.: 608,073

[22] Filed: Feb. 28, 1996

[51] Int. Cl.$^6$ ..................................... H01G 9/02
[52] U.S. Cl. .................. 361/505; 361/502; 361/527; 564/230
[58] Field of Search ......................... 361/500, 502, 361/503, 504, 505, 512, 511, 523, 524, 525, 527, 526; 564/230, 240, 231; 29/25.03; 544/162

[56] References Cited

U.S. PATENT DOCUMENTS

| | | | |
|---|---|---|---|
| 5,132,423 | 7/1992 | Brunelle et al. | 544/162 |
| 5,383,089 | 1/1995 | Williams et al. | 361/502 |
| 5,426,561 | 6/1995 | Yen et al. | 361/502 |

*Primary Examiner*—Leo P. Picard
*Assistant Examiner*—Anthony Dinkins
*Attorney, Agent, or Firm*—William H. Pittman

[57] ABSTRACT

Ultracapacitors including at least one cell with two solid, non-porous current collectors, two porous electrodes, preferably of carbon, and a porous separator between the electrodes, employ as electrolytes materials comprising at least one hexasubstituted guanidinium salt. Such salts may be employed in solution in a stable organic liquid such as propylene carbonate, or neat in liquid form. They may be prepared by first preparing a hexasubstituted guanidinium halide and then performing an anion exchange reaction, either with a salt which forms an insoluble halide such as a silver salt or by a liquid—liquid extraction method.

27 Claims, 1 Drawing Sheet

HEXASUBSTITUTED GUANIDINIUM SALTS AND ULTRACAPACITORS EMPLOYING THEM AS ELECTROLYTES

BACKGROUND OF THE INVENTION

This invention relates to ultracapacitors and electrolytes for use therein.

Ultracapacitors have been proposed for use as replacements for batteries in electric vehicles and in vehicles with hybrid power sources. They have also been proposed as backup power sources to be used in case of power failures. Thus, the development of relatively cheap and effective electrolyte systems for ultracapacitors is of current interest.

The electrical behavior of an ultracapacitor depends on the formation of compact electrical double layers. In the typical construction of an ultracapacitor cell, two metallic current collectors are separated by porous electrodes, typically of carbon, which in turn are separated by a porous, non-conducting separator layer. The pores in the electrodes and separator are filled with an electrolyte.

In operation, a current is applied to the electrodes at a voltage below that at which an electrolytic reaction will take place. As a result, charged ions, typically from dissociation of salts in the electrolyte, accumulate on the surfaces of the electrodes, creating a potential difference which is available to produce current when desired.

A major challenge in ultracapacitor design is the selection of a suitable electrolyte. It might be expected that aqueous electrolytes would be preferred by reason of their very low cost. However, they are characterized by a low "potential window" by reason of the electrolysis of water at potentials above about 1.2 V. The potential windows of many organic systems are much higher, frequently on the order of 2.3–3.5 V, and therefore organic systems are under particular study.

A promising genus of electrolytes from the viewpoint of operativity employs nitrogen-containing onium salts as electrolyte materials. These salts are generally dissolved in a solvent with high solvating power, good oxidation-reduction stability and low volatility, such as 1,2-propylene carbonate (hereinafter sometimes "propylene carbonate"). The conductivities and potential windows of quaternary ammonium salts, especially the fluoborates (i.e., tetrafluoroborates) and hexafluorophosphates, are particularly advantageous. However, these salts are quite expensive and this has been a barrier to the development of practical ultracapacitors employing them.

In addition, the solubilities of quaternary ammonium salts in suitable organic solvents are limited. For example, the saturation concentration of tetraethylammonium fluoborate in propylene carbonate is only about 1.0M. This limits its use as a feasible electrolyte material under Department of Energy standards, which define the optimal minimum ion concentration as 1.87M.

Also of interest is the development of solventless ultracapacitor electrolytes which are liquid at ambient temperature. Studies have been conducted on eutectic mixtures containing aluminum chloride and on combinations of aluminum chloride with various organic materials including quaternary ammonium salts and trialkylsulfonium salts. For the most part, however, such mixtures are chemically aggressive and sensitive to moisture. In addition, they frequently require temperatures above ambient in order to remain in the liquid state.

For all of these reasons, the development of inexpensive and practical ultracapacitor electrolytes, both neat and including solvents, remains of high interest.

SUMMARY OF THE INVENTION

The present invention is based on the discovery that hexasubstituted guanidinium salts are highly conductive and have advantageous potential windows for use in ultracapacitors. In addition, said hexasubstituted guanidinium salts are relatively inexpensive to prepare.

Accordingly, one aspect of the invention is an ultracapacitor comprising at least one cell, said cell comprising:

two solid, non-porous current collectors;

two porous electrodes separating said current collectors and in electrically conductive contact therewith;

a porous separator between said electrodes; and an electrolyte occupying fie pores in said electrodes and separator, said electrolyte comprising at least one hexasubstituted guanidinium salt having the formula

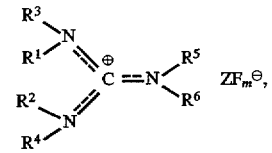

wherein:

each of $R^{1-2}$ is independently a $C_{1-6}$ alkyl radical, or $R^1$ and $R^2$ together form a $C_{2-6}$ alkylene radical;

each of $R^{3-6}$ is independently a $C_{1-6}$ alkyl radical, or at least one of the $R^3$–$R^5$ and $R^4$–$R^6$ combinations together form a $C_{2-6}$ alkylene radical;

Z is an element capable of forming a perfluorinated anion; and m-1 is the valence of Z.

Another aspect of the invention is a hexasubstituted guanidinium salt having the above formula.

Still another aspect is a method (hereinafter sometimes "liquid—liquid extraction method") for preparing a guanidinium salt having a non-halide anion which comprises intimately contacting an aqueous solution comprising a corresponding guanidinium halide and an alkali metal salt of said anion with an organic liquid which is immiscible with said aqueous solution and which is a solvent for said guanidinium salt, whereupon said guanidinium salt is formed and transferred to said organic liquid. The alkali metal salts may be either initially introduced or formed in situ.

DETAILED DESCRIPTION; PREFERRED EMBODIMENTS

As noted hereinabove, the ultracapacitors according to the invention comprise at least one cell. As a practical matter, however, they generally comprise a plurality, often a large number, of cells connected in series. Adjacent cells can share current collectors, typically designated "bipolar electrodes", or the collectors of adjacent cells can be connected by physical contact or by other conventional means such as wires.

Figure 1:
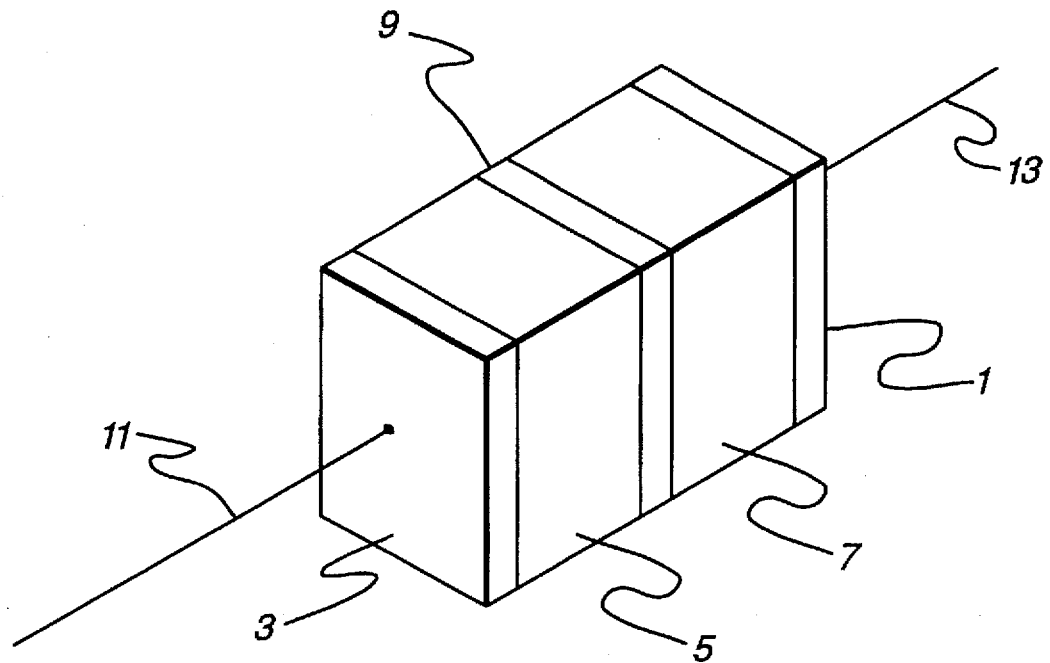
FIGS. 1–2 are schematic depictions, in perspective and in cross-section respectively, of a typical ultracapacitor cell representative of the cells of ultracapacitors of the present invention.
Figure 2:
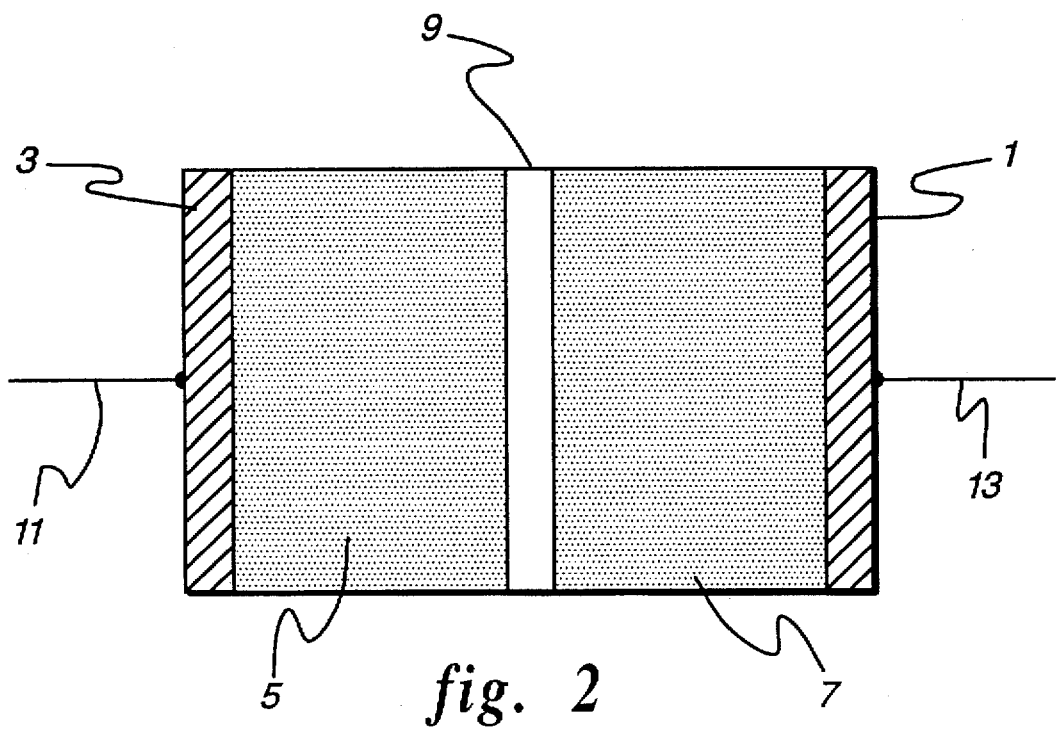

The construction of a single ultracapacitor cell is depicted in FIGS. 1–2. Non-porous, conductive current collectors 1 and 3, typically of metal or a conductive polymer, are separated by a space filled with porous electrodes 5 and 7, typically of carbon and/or other high surface area conductive material which may or may not have open cell pores within their structure. Said electrodes are in electrically conductive contact with current collectors 1 and 3 and are in turn separated by porous separator 9 of a suitable non-conductive material such as cellulose or silica gel. The pores in electrodes 5 and 7 and separator 9 are filled with the electrolyte. Conductors 11 and 13 connect successive cells.

The essential feature of the present invention is the identity of the electrolyte, which comprises at least one hexasubstituted guanidinium salt having the above formula. Mixtures of such guanidinium salts may be employed as well as the individual salts; in fact, mixtures are sometimes preferred by reason of the resulting increase in solubility often observed.

In said formula, the $R^{1-2}$ radicals may each be $C_{1-6}$ alkyl, preferably primary alkyl. Alternatively, $R^1$ and $R^2$ together can form a $C_{2-6}$ alkylene radical, preferably a linear alkylene radical.

The $R^{3-6}$ radicals may also be $C_{1-6}$ alkyl. Alternatively, either the $R^3$–$R^5$ or the $R^4$–$R^6$ combinations, or both, may be $C_{2-6}$ alkylene. Thus, the use of fused ring guanidinium salts is contemplated as part of the invention.

It is important that the electrolyte be electrochemically inert over a wide range of potentials. For this purpose, the most suitable anions are perfluorinated anions. The preferred anions are fluoborate ($BF_4^-$) and hexafluorophosphate ($PF_6^-$).

As indicated by the dashed bonds in the formula, the positive charge in the hexasubstituted guanidinium salts is delocalized over one carbon and three nitrogen atoms. This is believed to contribute to the salt's stability under the conditions of ultracapacitor usage.

In one embodiment of the invention, the electrolyte is a solution of said hexasubstituted guanidinium salt in a polar aprotic organic liquid. Suitable organic liquids are those which are substantially stable to oxidation and reduction, of low volatility and capable of dissolving said hexasubstituted guanidinium salt in a proportion effective for use as an electrolyte. The preferred liquids are alkylene carbonates, esters and lactones as illustrated by ethylene carbonate, propylene carbonate and γ-butyrolactone, with propylene carbonate often being especially preferred by reason of its relatively low cost.

It is also within the scope of the invention to prepare hexasubstituted guanidinium salts which may be employed as neat liquids as electrolytes. Several liquid salts have been discovered; in general, two or three nitrogen atoms therein contain alkyl groups of differing lengths. Examples are the N,N',N"-trimethyl-N,N', N"-tri-n-butylguanidinium salts and the N,N'-di-n-butyl-N,N'-dimethyl-N", N"diethylguanidinium salts.

The hexasubstituted guanidinium salts of this invention may be prepared by a two-step procedure in which the first step is the preparation of a hexasubstituted guanidinium halide, most often the chloride, and the second step is anion exchange to convert the halide to a salt with the perfluorinated anion. The first step, the preparation of the guanidinium halide, may follow the procedure disclosed, for example, in U.S. Pat. No. 5,132,423. In this procedure, a tetraalkylurea or heterocyclic analog thereof first undergoes reaction with phosgene or phosphorus oxychloride, or a corresponding thiourea undergoes reaction with an N,N-dialklylcarbamoyl halide, to yield a chloroformamidinium salt, frequently referred to as a "Viismeier salt", followed by reaction of said salt with a dialklyamine or heterocyclic analog thereof. Reference is made to Kantlehner et al, *Liebigs Ann. Chem.*, 1984, 108–126, and Pruszynski, *Can. J. Chem.*, 65, 626–629 (1987). Procedures which can maximize the yields of these reactions are disclosed in copending, commonly owned application Ser. No. 08/583,921. All of said publications are incorporated by reference herein.

The anion exchange step can be effected by contacting the hexasubstituted guanidinium halide, generally in solution in a polar organic solvent such as tetrahydrofuran or acetonitrile, with a salt having a perfluorinated anion and a cation which forms an insoluble halide. Suitable salts of this type include silver fluoborate and silver hexafluorophosphate. The exchange reaction is typically conducted in an aprotic organic solvent such as acetonitrile. It is complete when all the silver halide has precipitated. Yields are frequently quantitative or nearly so.

Use of the silver salt method may be inadvisable if complete separation of silver is not achieved, since residual silver can form dendrites and/or react with other cell materials to form conductive pathways between the electrodes and short-circuit the ultracapacitor. Therefore, it is generally preferred to employ the liquid—liquid extraction method of this invention in which a guanidinium halide undergoes reaction with an alkali metal, most often sodium, salt having the perfluorinated anion. The hexasubstituted guanidinium halide and alkali metal salt are typically introduced in aqueous solution, frequently the same aqueous solution, and are contacted batchwise or continuously with a water-immiscible organic liquid which is capable of dissolving the product hexasubstituted guanidinium salt. Chlorinated alkanes, especially methylene chloride, are often preferred for this purpose. The mole ratio of alkali metal salt to guanidinium halide is at least about 1.0:1 and preferably about 2.2–6.0:1.

Upon contact of the immiscible liquid with the aqueous solution, an exchange reaction takes place which is driven by the tendency of the hexasubstituted guanidinium salt to migrate to the organic phase, while by-product alkali metal halide remains in the aqueous phase. Contact between the aqueous and organic phases for this purpose is typically at ambient temperatures in the range of about 20°30° C. Again, the reaction can often be conducted to produce essentially quantitative yields of the desired product.

Following preparation, the hexasubstituted guanidinium salts may be isolated and purified by conventional methods. It is often highly preferred to dry the solution of product over a drying agent such as sodium sulfate, magnesium sulfate or molecular sieves prior to removing solvent. Typically, solvents are then removed by evaporation and purification is effected by recrystallization from an organic liquid or mixture of organic liquids. The identities of suitable liquids will be apparent to those skilled in the art or can be determined by simple experimentation. Often, a mixture of one liquid in which the product is highly soluble and another in which it has low solubility is employed. For the hexasubstituted guanidinium salts of the present invention, mixtures comprising such liquids as toluene, ethyl acetate, methylene chloride, chloroform and ethyl ether in varying proportions may conveniently be employed. Liquid products may frequently be employed as obtained after evaporation of solvent, without further purification.

Methods of preparing the hexasubstituted guanidinium salts of the present invention are illustrated by the following examples. The identities of the products were confirmed by proton and carbon-13 nuclear magnetic resonance spectroscopy, capillary ion electrephoresis and/or elemental analysis.

EXAMPLE 1

A 500-ml round-bottomed flask containing a magnetic stirrer was charged with 20 g (130.5 mmol) of 1,5,7-triaza-7-methylbicyclo[4.4.0]dec-5-ene and 200 ml of tetrahydrofuran. The resulting solution was cooled to 0° C. and a solution of 18.526 g (130.5 mmol) of methyl iodide in 50 ml of tetrahydrofuran was added over 20 minutes, with stirring. The solution became cloudy during the addition and a white, powdery precipitate began to form. Upon completion of the addition, the solution was stirred for one hour at 0° C., one hour at room temperature and one hour at 50° C. It was then cooled to room temperature and 200 ml of ethyl ether was added, after which the white precipitate which formed was filtered, rinsed with ethyl ether and dried overnight at 50° C. under vacuum. The desired 1,5,7-triaza-5,7-dimethylbicyclo[4.4.0]dec-5-enium iodide, m.p. 254–256° C. with decomposition, was obtained in quantitative yield.

A 500-ml round-bottomed flask containing a magnetic stirrer was charged with 200 ml of acetonitrile and cooled to 0° C. Silver fluoborate, 23.08 g (118.6 mmol) was added, whereupon a homogeneous solution was formed. After stirring the solution for 15 minutes, a solution of 35 g (118.6 mmol) of 1,5,7,-triaza-5,7-dimethylbicyclo[4.4.0]dec-5-enium iodide in 50 ml of acetonitrile was added over about 30 minutes, whereupon the solution became cloudy and a white precipitate of silver iodide began to form. After addition was complete, the solution was stirred for one hour at 0° C. and one hour at room temperature. Ethyl ether, 50 ml, was added and the mixture was again stirred for 10 minutes. The white precipitate which formed was allowed to settle and pack and the liquid layer was removed by decantation. Upon vacuum stripping of the solvent, the desired 1,5,7-triaza-5,7-dimethylbicyclo[4.4.0]dec-5-enium fluoborate, m.p. 209.5°211 ° C. with decomposition, was obtained in quantitative yield. It was vacuum dried overnight.

EXAMPLE 2

Following the procedure of Example 1, equimolar quantities are hexaethylguanidinium bromide and silver fluoborate were brought into contact. The product, hexaethylguanidinium fluoborate, m.p. 230°–232° C. with decomposition, was obtained in quantitative yield.

EXAMPLE 3

A 1000-ml round-bottomed flask equipped with a magnetic stirrer was charged with 600 ml of methylene chloride. A 1-I heavier-than-water liquid—liquid extractor, equipped with a reflux condenser, was attached and charged with about 150 ml of methylene chloride, enough to cover the side siphon port. An aqueous solution of 53.41 g (486.5 mmol) of sodium fluoborate and 25 g (88.3 mmol) of 1,5,7-triaza-5,7-dimethylbicyclo[4.4.0]dec-5-enium iodide was filtered and layered onto the methylene chloride phase in the extractor. The flask was immersed in a heat bath at 60° C. and the methylene chloride was heated under reflux for 16 hours. The organic phase was then removed and vacuum stripped. The product, a white powder, was the desired 1,5,7-triaza-5,7-dimethylbicyclo[4.4.0]dec-5-enium fluoborate, m.p. 209.5°–211 ° C. with decomposition, obtained in quantitative yield; it was dried overnight at 50° C. under vacuum and recrystallized from a toluene-methylene chloride mixture.

EXAMPLE 4

Following the procedure of Example 3, hexaethylguanidinium fluoborate, m.p. 230°–232° C. with decomposition, was prepared in quantitative yield by the reaction of 486.5 mmol of sodium fluoborate with 97.3 mmol of hexaethylguanidinium bromide and recrystallized from a toluenemethylene chloride mixture.

EXAMPLE 5

Following the procedure of Example 3, hexaethylguanidinium hexafluorophosphate, m.p. 305°–307° C. with decomposition, was prepared in quantitative yield by the reaction of 238.1 mmol of sodium hexafluorophosphate with 64.8 mmol of hexaethylguanidinium bromide and recrystallized from a methylene chloride-ethyl ether mixture.

EXAMPLE 6

Following the procedure of Example 3, N,N-di-n-propyl-N',N',N"N"-tetramethylguanidinium fluoborate, m.p. 171°–172.5° C., was prepared in quantitative yield by the reaction of 572.5 mmol of sodium fluoborate with 135.7 mmol of N,N-di-n-propyl-N',N',N"N"tetramethylguanidinium chloride. The methylene chloride solution thereof was dried over magnesium sulfate and the product was recrystallized from a methylene chloride-ethyl ether mixture.

EXAMPLE 7

Following the procedure of Example 3, N,N-di-n-propyl-N',N', N"N"-tetraethylguanidinium fluoborate, m.p. 120.5°–122° C., was prepared in quantitative yield by the reaction of 567.8 mmol of sodium fluoborate with 110 mmol of N,N-di-n-propyl-N',N',N"N"tetraethylguanidinium chloride. The methylene chloride solution thereof was dried over sodium sulfate and the product was recrystallized from a methylene chloride-ethyl ether mixture.

EXAMPLE 8

Following the procedure of Example 3, N-n-propyl-N,N', N',N"N"-pentamethylguanidinium fluoborate, m.p. 226°–228° C., was prepared in quantitative yield by the reaction of 572.5 mmol of sodium fluoborate with 137 mmol of N-n-propyl-N,N',N',N"N"pentamethylguanidinium chloride. The methylene chloride solution thereof was dried over magnesium sulfate and the product was recrystallized from a methylene chloride-ethyl ether mixture.

EXAMPLE 9

Following the procedure of Example 3, N,N-di-n-butyl-N',N',N"N"-tetramethylguanidinium fluoborate, m.p. 68°–69.5° C., was prepared in quantitative yield by the reaction of 572.5 mmol of sodium fluoborate with 137 mmol of N,N-di-n-butyl-N',N',N"N"-tetramethylguanidinium chloride. The methylene chloride solution thereof was dried over sodium sulfate and the product was recrystallized from a methylene chloride-ethyl ether mixture.

EXAMPLE 10

Methylene chloride, 600 ml, was charged to the flask in the apparatus employed in Example 3, and approximately 150 ml of methylene chloride (enough to cover the side siphon port) was charged to the extractor. A solution was prepared by adding first 35 g (318.8 mmol) of sodium fluoborate and then 42 g (137 mmol) of N,N',N"-tri-n-butyl- N,N',N"-trimethylguanidinium chloride to 600 ml of deionized water. The guanidinium chloride dissolved rapidly but an oil layer soon developed. The solution was stirred for 10 minutes and filtered, whereupon the oil collected on the filter. It was found to be pure N,N',N"-tri-n-butyl-N,N',N"-trimethylguanidinium fluoborate (42.5 g).

The filtrate was layered onto the methylene chloride phase in the extractor and extraction was conducted as in Example 3 for 12 hours. The previously separated oil was added to the methylene chloride phase, yielding a homogeneous solution, and the methylene chloride phase was separated and dried over anhydrous sodium sulfate. The dried solution was filtered and vacuum stripped, yielding about 49.5 g of the desired N,N',N"-tri-n-butyl-N,N',N"-trimethylguanidinium fluoborate as a colorless, air-stable, hydrophobic liquid which was dried overnight at 50° C. under vacuum.

EXAMPLE 11

Following the procedure of Example 10, N,N'-di-n-butyl-N,N'-dimethyl-N",N"-diethylguanidinium fluoborate was prepared in quantitative yield as a liquid by the reaction of 323.3 mmol of sodium fluoborate with 120 mmol of N,N'-di-n-butyl-N,N'-dimethyl-N",N"-diethylguanidinium chloride.

EXAMPLE 12

Following the procedure of Example of 9, N,N',N"-tri-n-butyl-N, N', N"-trimethylguanidinium hexafluorophosphate was prepared in quantitative yield as an air-stable, hydrophobic liquid by the reaction of 506 mmol of sodium hexafluorophosphate with 137 mmol of N,N',N"-tri-n-butyl-N,N',N"-trimethylguanidinium chloride.

EXAMPLE 13

Following the procedure of Example of 9, N,N',N"-tri-n-butyl-N,N',N"-triethylguanidinium hexafluorophosphate was prepared in quantitative yield as an air-stable, hydrophobic liquid by the reaction of 400 mmol of sodium hexafluorophosphate with 160 mmol of N,N',N"-tri-n-butyl-N,N',N"-triethylguanidinium chloride.

The viscosities at 25° C., densities, molar conductivities and saturation molar solubilities in propylene carbonate of the hexasubstituted guanidinium salts of the present invention are listed in the following table:

| Example | Viscosity, cps | Density, g/ml | Molar conductivity, S/cm × 10³ | Solubility, M |
|---|---|---|---|---|
| 1 | 15.1 | 1.252 | 1.34 | 2.73 |
| 2 | — | — | — | 1.5–2.0 |
| 4 | 8.72 | 1.136 | 1.06 | 1.61 |
| 5 | 8.17 | 1.199 | 0.96 | 1.48 |
| 10 | 8.18 | 1.041 | 0.30 | — |
| 11 | 3.77 | 1.053 | 0.82 | — |
| 12 | 22.0 | 1.149 | 0.13 | — |
| 13 | — | 1.025 | — | — |

Thus, the guanidinium salts of the invention have solubilities substantially greater than the quaternary ammonium salts in the same solvents. For those whose solubilities are too low when they are employed alone, it is possible to prepare mixtures which have higher solubility levels. The products of Examples 10–12, being liquid at room temperature, have potential for employment as electrolytes in the liquid phase.

A determination of conductivity in solution at various concentrations has shown that the compounds of Examples 1 and 2 have essentially the same conductivity as tetraethylammonium fluoborate at concentrations up to about 1M. Above that level, the conductivities of the salts of this invention increase and then decrease slightly as the solubility limit is approached. The salts of the invention, therefore, have a greater useful concentration range than tetraethylammonium fluoborate, which forms a saturated solution at about 1M.

Cyclic voltammetry determinations on the compound of Example 2 and tetraethylammonium fluoborate show the former to have a substantially lower electrolysis current at high negative voltage levels. Thus, the compound of the invention is superior in this respect to the quaternary ammonium salt.

Finally, an ultracapacitor employing as an electrolyte the compound of Example 1 at a concentration of 1.5M in propylene carbonate has a potential window of about 3 V.

What is claimed is:

1. An ultracapacitor comprising at least one cell, said cell comprising:

two solid, non-porous current collectors;

two porous electrodes separating said current collectors and in electrically conductive contact therewith;

a porous separator between said electrodes; and an electrolyte occupying the pores in said electrodes and separator, said electrolyte comprising at least one hexasubstituted guanidinium salt having the formula

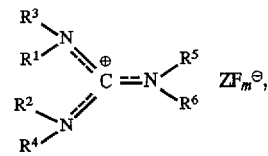

wherein:

each of $R^{1-2}$ is independently a $C_{1-6}$ alkyl radical, or $R^1$ and $R^2$ together form a $C_{2-6}$ alkylene radical; each of $R^{3-6}$ is independently a $C_{1-6}$ alkyl radical, or at least one of the $R^3$–$R^5$ and $R^4$–$R^6$ combinations together form a $C_{2-6}$ alkylene radical;

Z is an element capable of forming a perfluorinated anion; and m-1 is the valence of Z.

2. An ultracapacitor according to claim 1 which comprises a plurality of said cells.

3. An ultracapacitor according to claim 1 wherein said current collectors are metallic.

4. An ultracapacitor according to claim 3 wherein said electrodes are of carbon.

5. An ultracapacitor according to claim 4 wherein said electrolyte comprises one of said hexasubstituted guanidinium salts.

6. An ultracapacitor according to claim 4 wherein said electrolyte comprises a mixture of said guanidinium salts.

7. An ultracapacitor according to claim 4 wherein the electrolyte is a solution of said hexasubstituted guanidinium salt in a polar aprotic organic liquid.

8. An ultracapacitor according to claim 7 wherein said liquid is propylene carbonate.

9. An ultracapacitor according to claim 4 wherein said electrolyte is a neat hexasubstituted guanidinium salt in liquid form.

10. An ultracapacitor according to claim 4 wherein Z is boron and m is 4, or Z is phosphorus and m is 6.

11. A salt according to claim 4 wherein Z is boron and m is 4, or Z is phosphorus and m is 6.

12. A salt according to claim 11 which is a 1,5,7-triaza-5,7-dimethylbicyclo[4.4.0]dec-5-enium salt.

13. A salt according to claim 11 which is a hexaethylguanidinium salt.

14. A salt according to claim 11 which is a N,N-di-n-propyl-N',N',N'',N''-tetramethylguanidinium salt.

15. A salt according to claim 11 which is a N,N-di-n-propyl-N',N',N'',N''-tetraethylguanidinium salt.

16. A salt according to claim 11 which is a N-n-propyl-N,N',N',N'', N''-pentamethylguanidinium salt.

17. A salt according to claim 11 which is a N,N-di-n-butyl-N',N',N'',N''-tetramethylguanidinium salt.

18. A salt according to claim 11 which is a N,N',N''-tri-n-butyl-N,N',N''-trimethylguanidinium salt.

19. A salt according to claim 11 which is a N,N',N''-tri-n-butyl-N,N',N''-triethylguanidinium salt.

20. A salt according to claim 11 which is a N,N'-di-n-butyl-N,N'-dimethyl-N'',N''-diethylguanidinium salt.

21. A hexasubstituted guanidinium salt having the formula

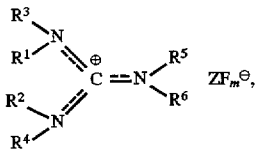 

wherein:
  each of $R^{1-2}$ is independently a $C_{1-6}$ alkyl radical, or $R^1$ and $R^2$ together form a $C_{2-6}$ alkylene radical;
  each of $R^{3-6}$ is independently a $C_{1-6}$ alkyl radical, or at least one of the $R^3$–$R^5$ and $R^4$–$R^6$ combinations together form a $C_{2-6}$ alkylene radical;

Z is an element capable of forming a perfluorinated anion; and m-1 is the valence of Z.

22. A method for preparing a guanidinium salt having a non-halide anion which comprises intimately contacting an aqueous solution comprising a corresponding guanidinium halide and an alkali metal salt of said anion with an organic liquid which is immiscible with said aqueous solution and which is a solvent for said guanidinium salt, whereupon said guanidinium salt is formed and transferred to said organic liquid.

23. A method according to claim 22 wherein the organic liquid is a chlorinated alkane.

24. A method according to claim 23 wherein the chlorinated alkane is methylene chloride.

25. A method according to claim 22 wherein the non-halide anion has the formula $$ZF_m^{\ominus},$$

wherein Z is an element capable of forming a perfluorinated anion and m-1 is the valence of Z.

26. A method according to claim 25 Wherein Z is boron and m is 4.

27. A method according to claim 25 wherein Z is phosphorus and m is 6.

* * * * *